Patented Jan. 27, 1931

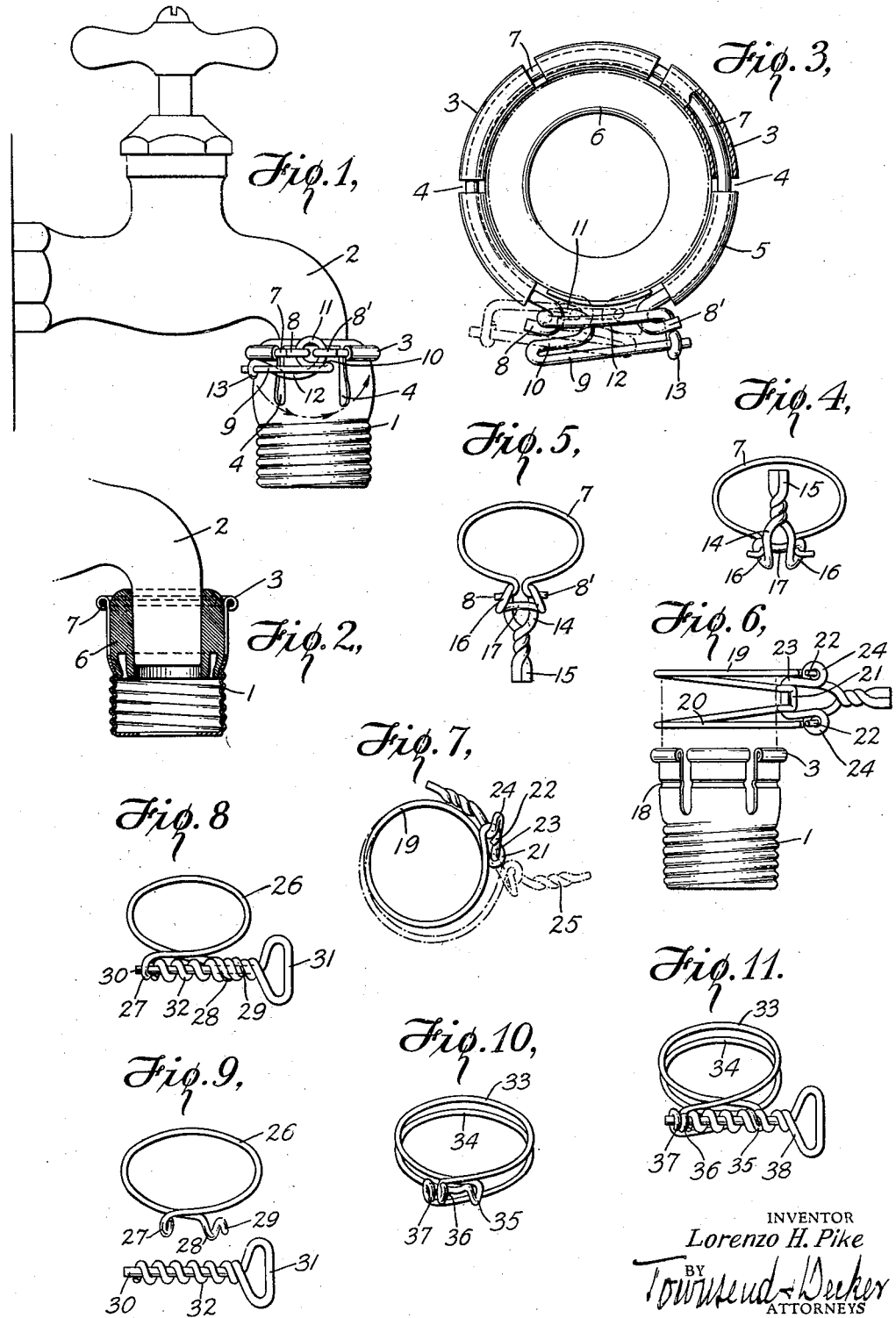

1,790,111

UNITED STATES PATENT OFFICE

LORENZO H. PIKE, OF BROOKLYN, NEW YORK, ASSIGNOR TO BRASS GOODS M'F'G. CO., OF BROOKLYN, NEW YORK, A CORPORATION OF NEW YORK

FAUCET CLAMP

Application filed January 11, 1928. Serial No. 245,862.

This invention relates to connecting devices intended primarily but not necessarily for use with a conventional form of faucet or spigot whereby connection may be easily made between said faucet and a tube, hose or the like.

The principal object of the invention is the construction of a device of the above character which may be expeditiously forced into clamping position by simple manipulation of a clamping device of wire without the use of screws or nuts or analogous mechanical means requiring the employment of tools.

Further and other objects and advantages of the invention will appear from the accompanying specification, the invention consisting in the novel clamp hereinafter more particularly described and then specified in the claims.

The drawing hereto annexed illustrates a practical embodiment of the invention in which:

Fig. 1 is a front elevation of a clamp embodying the invention showing it in operative position clamped to a conventional faucet or spigot.

Fig. 2 is a sectional view of the clamp.

Fig. 3 is an enlarged plan view thereof.

Figs. 4 and 5 are perspective views of a modified form of clamping device.

Fig. 6 is a front elevation of a further modification of the clamping device before it is assembled with the body of the clamp shown in conjunction therewith.

Fig. 7 is a plan view of the clamping device of the modification of Fig. 6.

Figs. 8 and 9 are perspective views of a further modification of the clamping device, Fig. 9 showing the two parts thereof in disassembled position.

Figs. 10 and 11 are perspective views of still a further modification.

Referring in detail to the several figures of the drawing:

1 indicates a metallic hollow body or shell which is preferably screw-threaded at its lower end as indicated to receive any conventional form of coupling (not shown) which may be attached to a hose or tube or the like whereby connection may be made between a faucet or spigot 2 with the hose or tube when the clamp is applied to the faucet in the manner to be hereinafter described.

The body or shell 1 is rolled over at its upper edge to provide a curled bead 3 and is split at its upper end at regular intervals as at 4 to form a plurality of compressible fingers 5 which may be compressed inwardly but which will expand outwardly and assume their normal position when pressure is released therefrom. Said body or shell 1 also carries a resilient gasket or sealing member 6 which fits snugly therein. 7 indicates a wire band supported within the bead 3 and having its free ends extending through a cut out portion in the bead 3 and bent or turned into hooks 8 and 8'.

For drawing the ends of said hooks 8 and 8' together to effect a pressing inwardly of the fingers 5, I have provided a clamping device or member comprising a wire the body portion of which is indicated at 9 and which is bent over parallel to itself as at 10, then looped as at 11, then bent into a curved or arcuate portion 12 and then bent outwardly and provided with an eye 13. Said eye receives the end of the body portion 9 to prevent this portion from being displaced from its normal operating position.

To apply the clamp to the faucet or spigot 2 it is slipped over said faucet which enters the gasket or sealing member 6. The parts are then in the position shown in Fig. 3 with the hook 8 engaging within the loop 11 and the hook 8' engaging that end of the curved or arcuate portion 12 opposite the loop 11 and adjacent the eye 13. To tighten the clamp on the faucet whereby the fingers 5 will be compressed inwardly and will in turn compress the resilient gasket or sealing member 6 tightly against the faucet to make a tight and leak-proof connection between the clamp and faucet, the body 9 of the wire clamping device is rotated at the right on a horizontal line in a clockwise direction to force the hook 8' to ride along the curved or arcuate portion 12 until it reaches the loop 11, the hook 8 at the same time also riding on said loop until it reaches the opposite side of said loop, the hook 8' then occupying the side of the loop first occupied by the hook 8. The parts described then assume the clamping position shown in Fig. 1, the clamp then having been effectively and tightly secured to the faucet 2. To effect an unclamping of the clamp from the faucet, the body 9 of the wire clamping device is rotated in a counterclockwise direction and the parts will move in a direction opposite to those just described to release the pressure of the compressible fingers 5 against the gasket 5 and the consequent pressure of the gasket against the faucet 2 after which the clamp may be slipped off the faucet with facility and expedition.

In the modification illustrated in Figs. 4 and 5 the wire band 7 is of the same configuration as in the preferred form of the invention. For drawing the hooked ends 8 and 8' of said band together I have provided a clamping device made of a single piece of wire and comprising a U-shaped frame 14 the free ends of which are twisted together to provide a finger-piece 15, the portion of said wire at the top of the U being bent to form loops 16 connected together by the connecting member 17. Said loops 16 are inclined towards each other so that their edges provide cam surfaces against which the surfaces of the hooks 8 and 8' are adapted to ride whereby, when the clamping device is thrown in a pivotal movement in one direction, the hooks 8 and 8' are forced towards each other to retract the wire band 7 but when thrown in the other direction the wire band 7 is permitted to expand and the hooks 8 and 8' move away from each other. The application of this modification to the body or shell 1 previously described will be apparent.

In the modification of Figs. 6 and 7, I provide the body or shell 1 with a groove 18 encircling the same which is formed therein intermediate the head 3 and the lower screw-threaded portion of said shell. In this case I employ two wire bands, an upper one 19 and a lower one 20. The upper band is supported within the bead 3 and the lower one 20 seats within the groove 18. These wire bands are made of a single piece of wire bent in two portions with the bent portion turned over to form a hook 21, the two portions formed by this bending operation then being looped to form the upper and lower bands which are provided at their free ends with hooks 22. The clamping device or member which tightens the bands is also made of a single piece of wire bent to form a U-shaped frame 23 the base of which is engaged by the hook 21 and then bent to form two loops 24 which are engaged by the hooks 22. The free ends of said single piece of wire are also twisted together to provide a finger or operating piece 25. To effect the clamping operation the finger piece 25 is moved from the position shown in dotted lines in Fig. 7 to that shown in full lines. When so moved, the loops 24 ride on the hooks 22 as pivots causing the base of the frame 23 to press against those portions of the bands 19 and 20 adjacent the hook 21 so that portions will pass beneath the hooks 22 whereby the bands will be contracted and assume a clamping position in an obvious manner. When the finger piece 25 has reached the position shown in Fig. 7 the hook 21 has been thrown past dead center so that the parts will remain in clamped position until the finger piece 25 is manually pressed in the opposite direction.

In the modification illustrated in Figs. 8 and 9, I employ a single wire band 26 which is provided at its ends with loops 27 and 28, the end of the loop 28 being free and bent to project outwardly as shown at 29. The clamping device which is made of a single piece of wire is indicated at 30 and has a part thereof bent to form a key or finger piece 31, the remaining part of the wire being coiled around the body portion 30 as shown at 32 to simulate a screw thread. The body 30 is inserted through the loops 27 and 28 with the free end 29 engaging in the space between the convolutions of the coil 32. When the finger piece 31 is rotated or screwed the free end 29 of the loop 28 follows the convolutions of the coil 32 and when the end of the coil contacts with the loop 27 it forces said loop with it and causes the wire band 26 to contract in an obvious manner. Obviously this modification is used with the form of body or shell 1 shown in Fig. 1 in which the wire band is supported within the bead 3.

The modification of Figs. 10 and 11 is used in conjunction with the form of the body or shell shown in Fig. 6 which employs the additional groove 18. In this modification a double band is employed formed of a single piece of wire coiled to form an upper band 33 and a lower band 34. The single piece of wire is first bent in two portions and twisted at the bent portion to form a loop 35. The wire is then bent to form the two bands just referred to and the free ends thereof formed with hooks 36 and 37, the hook 36 lying intermediate the loop 35 and hook 37. The clamping device 38 is similar in construction to that illustrated in Fig. 9 and it is passed through the loop 35 and through the hooks 36 and 37. When it is screwed or rotated the wall of the loop 35 follows the convolutions of the coil on the clamping device and when the end of the coil engages the hooks 36 and 37 it forces them with it thereby contracting the bands in size and forcing them into clamping position in an obvious manner.

What I claim as my invention is:

1. In a clamp, a metallic body member provided with slots therein to form fingers, a resilient sealing member carried by said body member and having a longitudinal opening extending therethrough, a split wire band supported by said body member and clamping means engaging said wire band for tightening the same to compress said fingers against said sealing member.

2. In a clamp, a metallic hollow and compressible body member having a groove therein, a bead on said body member and a device comprising two bands one of which is supported within said bead while the other is supported within said groove and means for tightening said bands to clamp said body member against an object.

3. In a clamp, a metallic body member provided with slots therein to form fingers, a resilient sealing member carried within said body member and having a longitudinal opening extending therethrough, a bead on said body member, a split wire band supported within said bead and having hooked ends and a clamping member engaging said hooked ends to draw the same together whereby said fingers will be compressed against said resilient sealing member.

4. In a clamp, a metallic hollow body member and two bands carried thereby and formed of a single piece of wire and clamping means for tightening said bands to clamp said body member against an object.

Signed at Brooklyn, in the county of Kings and State of New York, this 5th day of January, A. D. 1928.

LORENZO H. PIKE.